United States Patent Office 3,583,946
Patented June 8, 1971

3,583,946
POLYUREAS DERIVED FROM DIPIPERIDINES
Frank Dobinson, Gulf Breeze, Fla., assignor to Monsanto Company, St. Louis, Mo.
No Drawing. Filed Apr. 24, 1969, Ser. No. 819,103
Int. Cl. C08g 22/02
U.S. Cl. 260—77.5                   7 Claims

ABSTRACT OF THE DISCLOSURE

Polymers suitable for forming filaments, films, and plastic products are derived from polymethylene dipiperidine and organic diisocyanates.

BACKGROUND OF THE INVENTION

It is well-known that diisocyanates will react with and add to chemical compounds containing active hydrogens. For example, it has previously been proposed to react diamines with diisocyanates to produce polyureas. However, the known polymers when used to form films or like thin products lack desired clarity. The polyureas described herein can be shaped into films which are exceptionally clear and sparkling. Furthermore, the films have superior flexibility and strength.

SUMMARY OF THE INVENTION

A polyurea having the following structural formula is prepared:

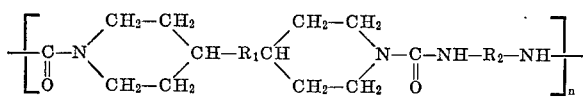

$R_1$ is a lower alkylene radical of 1–4 carbon atoms including, for example, methylene, ethylene, trimethylene and tetramethylene radicals. $R_2$ is a divalent organic radical free from reactive substituents, preferably selected from the group consisting of

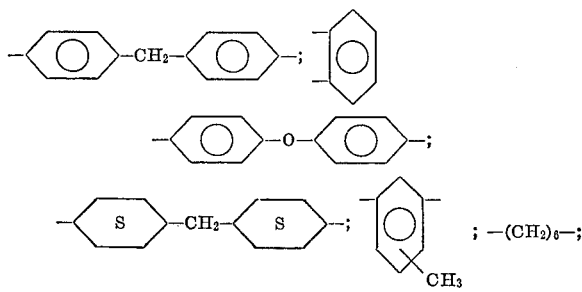

and including mixtures thereof.

The molecular weight of the polyurea should be sufficiently high so that fibers, filaments, films and other useful materials can be formed therefrom. In the above formula $n$ is a number indicative of the molecular weight and ordinarily will be above 25 and preferably in the range of 50 to 200.

DETAILED DESCRIPTION OF THE INVENTION

Requisite amounts of alkylene dipiperidine are brought into reacting contact with a suitable diisocyanate under suitable conditions to produce a polymer capable of being shaped into films, fibers and the like.

The alkylene dipiperidines employed in the preparation of the polyureas are of the general formula

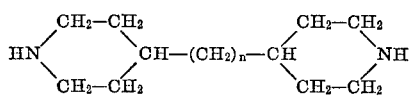

wherein $n$ is 1–4, inclusive. Specific dipiperidines include methylene dipiperidines, ethylene dipiperidines, trimethylene dipiperidines, and tetramethylene dipiperidines.

The diisocyanates are of the general formula

Among the diisocyanates employed in the preparation of the polyureas are: polymethylene diisocyanates, such as pentamethylene diisocyanate, hexamethylene diisocyanate, heptamethylene diisocyanate, etc.; aromatic diisocyanates such as meta-phenylene diisocyanate, para-phenylene diisocyanate, tolylene 2,4-diisocyanate, tolylene 2,6-diisocyanate, diphenylene-4,4'-diisocyanate, oxydiphenyl-4,4'-diisocyanate, naphthylene-1,5-diisocyanate, 4,4'-diphenylmethane-diisocyanate, 4,4'-diphenyldimethylmethane diisocyanate, etc.; cycloalkylene diisocyanates including cyclopentylene 1,3-diisocyanate, cyclohexylene 1,3-diisocyanate, cyclohexylene 1,4-diisocyanate, 4,4'-dicyclohexylmethane diisocyanate, 4,4'-dicyclohexyl-dimethyl methane diisocyanate, etc.; and mixtures thereof. Other similar organic diisocyanates may be used such as diphenylene-3,3'-dimethoxy-4,4'-diisocyanate.

The amounts of organic diisocyanate and dipiperidine may vary. In general, the dipiperidine is employed in a molar amount substantially equal to or in slight excess of the molar amount of diisocyanate employed.

In producing the polyurea of the present invention, the polymerization may be conducted in the presence of catalysts, as well as in the presence of molecular weight regulators. Other additives that modify the polymer such as delusterants, plasticizers, pigments, colorants, and oxidation inhibitors may also be incorporated in the polymer if desired. The polyurea may be advantageously blended with other polymer or may be used to form chain segments with other linear polymer-forming substances. Advantageously the polyurea described herein should comprise at least 80 weight percent of the composition used to make a film or fiber.

The new polymers may be prepared by mass polymerization, or aqueous suspension polymerization in a conventional manner. The preferred technique involves reacting the diisocyanate and dipiperidine in an organic solvent for at least one of the reactants, the solvent having no deleterious effect on either the diisocyanate or the dipiperidine, preferably under anhydrous conditions, at a temperature below 50° C., and for a time sufficient to form the urea linkages of length sufficient to impart film and fiber-forming qualities to the resulting polymer.

As known in the polymer art, inherent viscosity is directly related to the molecular weight of the polymer. It is important that the molecular weight of the diisocyanate-dipiperidine polymer be such that the inherent viscosity of the polymer is at least 0.4, and preferably from greater than 0.6. The inherent viscosity is measured at 25° C. at a concentration of 0.5% by weight of the polymer in a suitable solvent. The preferred solvent is N,N-dimethylacetamide containing 5% dissolved lithium chloride. To calculate inherent viscosity, the viscosity of the polymer solution is measured relative to that of the solvent alone by measuring the times of flow of equal volumes through the capillary of a standard viscometer and using the following equations:

$$\text{Inherent viscosity} = \log_n \frac{\text{solution time}}{\text{solvent time}} \Big/ C$$

where $C$ is the concentration expressed in grams of polymer per 100 mls. of solution.

The following examples illustrate the invention.

EXAMPLE I 2.10 grams of trimethylene dipiperidine having the formula:

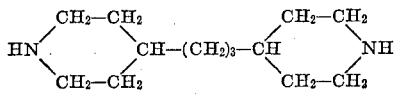

were dissolved at room temperature in 25 ml. N,N-dimethylacetamide in a 3-necked pear-shaped flask fitted with an efficient stirrer and through which a slow stream of dry nitrogen was allowed to pass. Then, 2.50 grams of 4,4'-diphenylmethane diisocyanate were added and washed into the flask with an additional 25 mls. of N,N-dimethylacetamide. The mixture rapidly thickened into a bright, clear dope. After an hour, 0.2 ml. of a 10% N,N-dimethylacetamide solution of ethylene diamine was added to block or destroy residual isocyanate groups. Films 2 mils thick of the resulting polymer were cast by drying uniform films of the dope at 70° C. for 3 hours. The films were sparkingly clear and surprisingly flexible and tough. The inherent viscosity of the polymer was 0.76. The melting point of the polymer as determined by differential thermal analysis (DTA) was 300° C. The polymer had recurring units as follows:

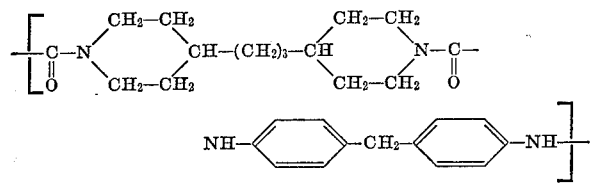

EXAMPLE II

While using the equipment and conditions set forth in the prior example, a polyurea was made from 2.10 grams of trimethylene dipiperidine and 1.60 grams of m-phenylene diisocyanate. Again it was observed that the films were clear, tough and flexible. The inherent viscosity of the polymer was 0.74. The DTA melting point of the polymer was 275° C. The polymer had recurring units as follows:

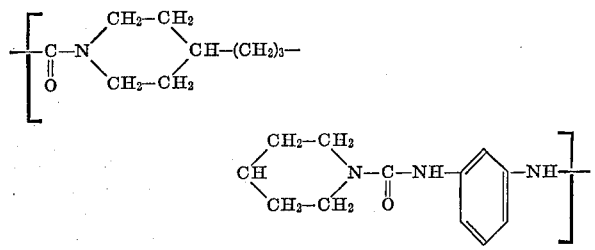

EXAMPLE III

The equipment and conditions described in Example I were used. This time an 80/20 mixture of 2,4- and 2,6-tolylene diisocyanate was reacted with an equimolar amount of trimethylene dipiperidine to form the polyurea. Films of this composition again were found to be clear, tough and flexible. The inherent viscosity of the polymer was 0.74. The DTA melting point of the polymer was 215° C. The polymer had recurring units generally as follows:

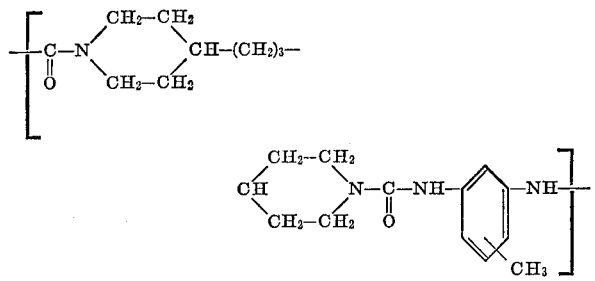

EXAMPLE IV

The equipment and conditions described in Example I were used. This time equimolar amounts of trimethylene dipiperidine and oxidiphenyl-4,4'-diisocyanate were reacted to form the polymer. The inherent viscosity of the polymer was 0.86. The DTA melting point of the polymer was 335° C. The polymer had recurring units as follows:

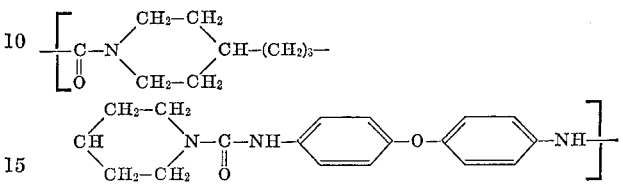

EXAMPLE V

To a briskly stirred solution of trimethylene dipiperidine in N,N-dimethylacetamide was added an equimolar amount of 4,4'-dicyclohexylmethane diisocyanate. Rapid stirring was maintained for 30 minutes, during which time a precipitate formed. The reaction product was separated by filtration and water washed. The resulting polymer was then vacuum dried at 80° C. The inherent viscosity of the polymer was 0.40. The block melting point of the polymer was 285° C. The polymer had recurring units as follows

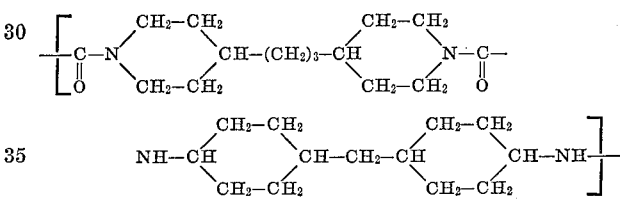

EXAMPLE VI 2.10 grams of trimethylene dipiperidine were dissolved in 200 mls. dry toluene; and the solution was rapidly stirred in a Waring type blender jar. Hexamethylene diisocyanate (1.68 gram) was dissolved in toluene; and the resulting solution was added to the jar all at once. Stirring was continued for 20 minutes. The solid resulting polymer precipitated, was separated by filtration, water washed and vacuum dried at 80° C. The inherent viscosity of the polymer was 1.14. The melting point of the polymer was 180–184° C.

EXAMPLE VII

The conditions and materials of Example IV were duplicated, except that the solvent was N-methyl pyrrolidone. The polymer formed a clear, water-white, viscous dope. Dilution with N,N-dimethylacetamide and precipitation with water gave a polymer that after drying had an inherent viscosity of 1.09.

EXAMPLE VII

Example I was repeated using N,N,N',N'-tetramethyl urea as the solvent. A clear, bright and viscous dope was formed. Isolated polymer had an inherent viscosity of 0.94.

Likewise similar polymers can be prepared from organic diamines (H₂N—R—NH₂) as already defined, and the bis(carbamylchloride) of trimethylene dipiperidine, i.e.

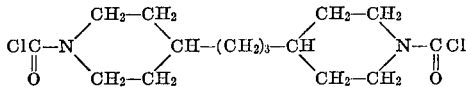

The polyureas of this invention find many applications. They can be spun into filaments and fiber. Furthermore, they can be cast into films which are clear and have excellent flexibility and tear strength.

What is claimed is:
1. A fiber-forming composition comprising a polyurea having the following recurring unit structure:

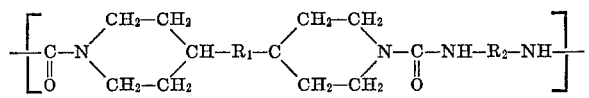

wherein $R_1$ is a lower alkylene radical of 1–4 carbon atoms; $R_2$ is a divalent organic radical free from reactive substituents.

2. A film-forming composition comprising a polyurea having the following recurring unit structure:

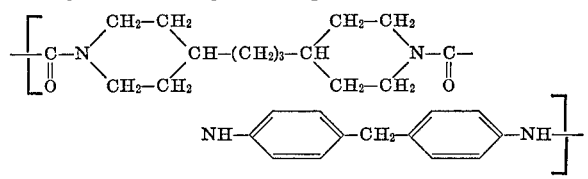

3. A film-forming composition comprising a polyurea having the following recurring unit structure:

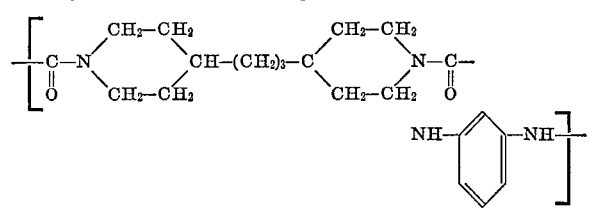

4. A film-forming composition comprising a polyurea having the following recurring unit structure:

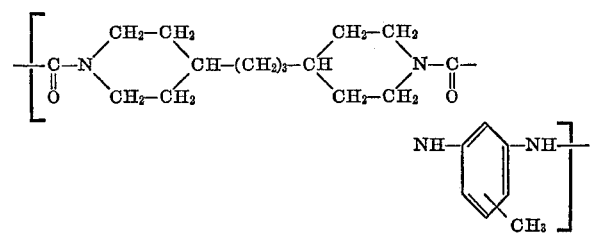

5. A film-forming composition comprising a polyurea having the following recurring unit structure:

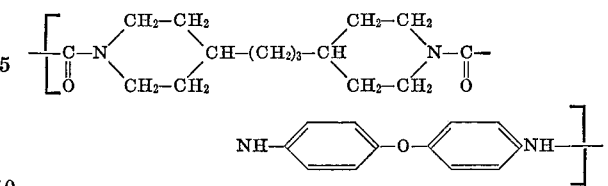

6. A film-forming composition comprising a polyurea having the following recurring unit structure:

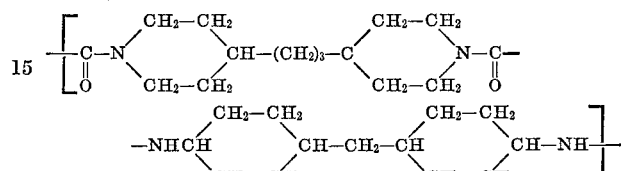

7. A fiber-forming composition comprising a polyurea having the following recurring unit structure:

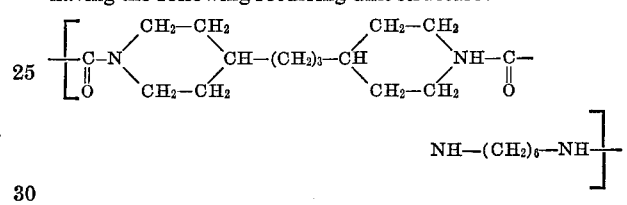

References Cited
UNITED STATES PATENTS 2,975,157   3/1961   Katz _____ 260—77.5
3,318,849   5/1967   Moseley, Jr., et al. ___ 260—77.5

DONALD E. CZAJA, Primary Examiner
M. I. MARQUIS, Assistant Examiner

U.S. Cl. X.R.
260—858R, 859R